(12) United States Patent
Becker

(10) Patent No.: US 11,521,439 B2
(45) Date of Patent: Dec. 6, 2022

(54) MANAGEMENT OF DATA AND SOFTWARE FOR AUTONOMOUS VEHICLES

(71) Applicant: Apex.AI, Inc., Palo Alto, CA (US)

(72) Inventor: Jan Becker, Palo Alto, CA (US)

(73) Assignee: APEX.AI, INC., Palo Alto, CA (US)

( * ) Notice: Subject to any disclaimer, the term of this patent is extended or adjusted under 35 U.S.C. 154(b) by 839 days.

(21) Appl. No.: 16/434,780

(22) Filed: Jun. 7, 2019

(65) Prior Publication Data

US 2019/0378363 A1 Dec. 12, 2019

Related U.S. Application Data

(60) Provisional application No. 62/683,596, filed on Jun. 11, 2018.

(51) Int. Cl.
*G07C 5/08* (2006.01)
*G06Q 20/12* (2012.01)
*H04L 67/00* (2022.01)
*G06Q 30/08* (2012.01)
*G05D 1/02* (2020.01)

(52) U.S. Cl.
CPC ......... *G07C 5/0841* (2013.01); *G05D 1/0221* (2013.01); *G06Q 20/123* (2013.01); *G06Q 30/08* (2013.01); *H04L 67/34* (2013.01)

(58) Field of Classification Search
CPC .. G07C 5/0841; G05D 1/0221; G06Q 20/123; G06Q 30/08; H04L 67/34; H04W 4/38
See application file for complete search history.

(56) References Cited

U.S. PATENT DOCUMENTS

| | | | |
|---|---|---|---|
| 9,714,089 B1* | 7/2017 | Louw | B64C 27/08 |
| 9,734,525 B2* | 8/2017 | Lunenfeld | G06Q 30/0603 |
| 11,048,248 B2* | 6/2021 | Celia | G05B 13/028 |
| 2018/0176727 A1* | 6/2018 | Williams | G16H 40/67 |

* cited by examiner

*Primary Examiner* — Kristie D Shingles
(74) *Attorney, Agent, or Firm* — Procopio, Cory, Hargreaves & Savitch LLP

(57) ABSTRACT

Management of data and software for autonomous vehicles. In an embodiment, sensor data is received. The sensor data is collected by one or more sensor systems of one or more vehicles, and submitted by a first user via at least one network. The sensor data is automatically analyzed to detect any problems with the sensor data and to enhance the sensor data, prior to publishing a description of the sensor data in an online marketplace. A graphical user interface is generated that comprises one or more screens of the online marketplace, via which a second user may view the description of the sensor data and purchase the sensor data for download via the at least one network.

37 Claims, 6 Drawing Sheets retrieved from https://scienceworld.scholastic.com/issues/2017-18/090417/hands-free-ride.html

MANAGEMENT OF DATA AND SOFTWARE FOR AUTONOMOUS VEHICLES

CROSS-REFERENCE TO RELATED APPLICATIONS

This application claims priority to U.S. Provisional Patent App. No. 62/683,596, filed on Jun. 11, 2018, which is hereby incorporated herein by reference as if set forth in full.

BACKGROUND

Field of the Invention

The embodiments described herein are generally directed to the management of data and software for autonomous vehicles, and, more particularly, to a platform for the collection and distribution of sensor data, control software for autonomous vehicles, and/or services around data and/or data processing for autonomous vehicles.

Description of the Related Art

The development of autonomous vehicles has become a major industry over the past few years. All major automotive companies and many information technology (IT) companies are currently developing software and components for autonomous vehicles. Due to the complexity of the software to be developed, this is a very resource-intensive process. In addition, the amount of data needed to train systems that are based on machine learning (e.g., using deep neural networks (DNNs), convolutional neural networks (CNNs), etc.) is enormous.

Despite the need for large amounts of data, currently, there is almost no reuse, sharing, or exchange of software or data due to the lack of established standards for software interfaces and platforms for data exchange. Most developers in the industry only collect and utilize their own data, without any exchange of data between developers.

What is needed is a common software platform, with common formats and interfaces, to foster the exchange and reuse of data, software, and other resources. The ability to efficiently reuse data across development projects would decrease development time, decrease the number of resources required for development, decrease the time need to perform experiments, and/or provide additional benefits to the development process.

SUMMARY

Accordingly, systems, methods, and non-transitory computer-readable media are disclosed to manage data and software for autonomous vehicles.

In an embodiment, a method is disclosed that comprises using at least one hardware processor to: receive sensor data, collected by one or more sensor systems of one or more vehicles, and submitted by a first user via at least one network; automatically analyze the sensor data to detect any problems with the sensor data and to enhance the sensor data, prior to publishing a description of the sensor data in an online store or other marketplace; and generate a graphical user interface comprising one or more screens of the online marketplace via which a second user may view the description of the sensor data and purchase the sensor data for download via the at least one network.

Detecting one or more problems may comprise detecting an interruption in the sensor data. Detecting one or more problems may comprise: detecting one or both of a type and configuration of sensors used to capture the sensor data; and determining whether or not the sensors properly captured data throughout the entire sensor data. Detecting one or more problems may comprise parsing the sensor data to determine whether or not the sensor data adheres to a particular format. The particular format may be Robot Operating System (ROS) bag format.

The method may further comprise using the at least one hardware processor to, when at least one problem is detected by the analysis of the sensor data: notify the first user about the at least one problem; and receive corrected sensor data from the first user via the at least one network.

Enhancing the sensor data may comprise: analyzing one or more characteristics of the sensor data to detect one or more events in the sensor data; and associating the detected one or more events with the sensor data. Associating the detected one or more events with the sensor data may comprise adding an indication of the one or more events to the description of the sensor data.

Enhancing the sensor data may comprise: computing one or more metrics of the sensor data; and associating the computed one or more metrics with the sensor data. Associating the computed one or more metrics with the sensor data may comprise adding an indication of the one or more metrics to the description of the sensor data. Computing one or more metrics of the sensor data may comprise comparing the sensor data to one or more other sensor data to determine a metric of how up-to-date the sensor data is.

Enhancing the sensor data may comprise: identifying a geographic location and time associated with the sensor data; retrieving environmental conditions, associated with the geographic location and time, from an external system, via the at least one network; and associating the environmental conditions with the sensor data.

Enhancing the sensor data may comprise removing data that identifies one or more of a person, a location, and a vehicle from the sensor data. Removing data that identifies a location from the sensor data may comprise pruning a beginning portion of the sensor data and an ending portion of the sensor data from the sensor data.

The method may further comprise using the at least one hardware processor to: receive one or more criteria from the second user; determine that the sensor data satisfies the one or more criteria; and notify the second user that the sensor data is available for purchase.

The method may further comprise using the at least one hardware processor to: receive one or more criteria from the first user; receive a search or request for sensor data from the second user, wherein the search or request for sensor data satisfies the one or more criteria; and notify the first user about the searched or requested sensor data. The request may comprise a bid price for the requested sensor data. The one or more criteria may comprise one or more of a geographical location within which the sensor data was collected, a characteristic of the sensor data, an event represented in the sensor data, and a metric of the sensor data.

The method may further comprise using the at least one hardware processor to provide a free sample of the sensor data to the second user. The method may further comprise using the at least one hardware processor to: analyze a pattern of the second user's access to free samples of sensor data via the online marketplace over a time period; and in response to the pattern of the second user's access matching a pattern that indicates an attempt to compose a data file from the free samples, restricting the second user's future access to free samples. The free sample may consist of a portion of the sensor data. The free sample may comprise a lower-resolution version of at least a portion of the sensor data.

The method may further comprise using the at least one hardware processor to: receive a software module, submitted by a third user, via the at least one network, wherein the software module comprises instructions for controlling an autonomous system of a vehicle; automatically analyze the software module to derive information about the software module; and generate a graphical user interface comprising one or more screens of the online marketplace via which another user may view a description of the software module and purchase the software module for download via the at least one network.

Analyzing the software module may comprise determining whether or not the software module is compatible with an application programming interface (API) of software for interacting with the autonomous system of the vehicle. The software for interacting with the autonomous system of the vehicle may be Apex.OS™.

Analyzing the software module may comprise computing a metric for the software module, wherein the description of the software module comprises the computed metric. The computed metric may comprise a functional safety compliance metric. The computed metric may comprise a functional performance metric. The computed metric may comprise a computational performance metric.

Analyzing the software module may comprise testing the software module using a plurality of types of sensors, wherein the description of the software module comprises each one of the plurality of types of sensors for which the software module was successfully tested.

The method may further comprise using the at least one hardware processor to: receive a description of a service, submitted by a fourth user, via the at least one network, wherein the service is related to autonomous vehicles; and generate a graphical user interface comprising one or more screens of the online marketplace via which another user may view a description of the service and purchase the service.

The method may further comprise using the at least one hardware processor to: receive a virtual map, submitted by a fifth user, via the at least one network; and generate a graphical user interface comprising one or more screens of the online marketplace via which another user may view a description of the virtual map and purchase the virtual map for download via the at least one network. The method may further comprise using the at least one hardware processor to: analyze the virtual map to determine whether or not the virtual map comprises a three-dimensional point cloud; and, when the virtual map is determined to comprise a three-dimensional point cloud, add an indication that the virtual map comprises a three-dimensional point cloud to the description of the virtual map. The method may further comprise using the at least one hardware processor to: receive a request for a virtual map of a geographical region that satisfies one or more criteria, via the at least one network; extract a portion, comprising the geographical region and satisfying the one or more criteria, from an existing virtual map that comprises the geographical region and at least one other geographical region; and provide the extracted portion, in response to the request, via the at least one network. The method may further comprise using the at least one hardware processor to: receive a request for a virtual map of a geographical region that satisfies one or more criteria, via the at least one network; generate a composite map, comprising the geographical region and satisfying the one or more criteria, from two or more existing virtual maps that each comprise a portion of the geographical region; and provide the composite map, in response to the request, via the at least one network.

The method may further comprise using the at least one hardware processor to: compute one or more aggregate metrics for a plurality of the sensor data; and provide the one or more aggregate metrics for purchase or analysis via one or more screens of the online marketplace.

Any of the methods described herein may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for the management of data and software for autonomous vehicles. While the disclosed embodiments will be described for use with autonomous vehicles, it should be understood that the disclosed embodiments may be used for any autonomous system or other system. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Apex.OS™

Apex.AI™ of Palo Alto, Calif., has developed Apex.OS™, which extends the Robot Operating System (ROS), for use in safety-critical and security-critical applications, such as autonomous vehicles. Specifically, Apex.OS™ is a software framework and software development kit (SDK) for autonomous-vehicle applications that abstracts interaction with underlying hardware (e.g., processors, interfaces, bus systems, etc.), as well as middleware, into simplified application programming interfaces (APIs) for software developers. Apex.OS™ provides real-time security and functional safety, including safety certification to enable rapid prototyping and deployment of self-driving applications. Apex.OS™ is fully compatible with ROS 2 and designed to provide a seamless transition from research code in ROS to production code running in Apex.OS™. Apex.OS™ abstracts the underlying computing, vehicle, and sensor hardware and provides APIs for application developers to interface with perception, localization, planning, and control algorithms. Original equipment manufacturers (OEMs), automotive suppliers, fleet operators, and/or the like can purchase and/or license Apex.OS™ for use in their vehicles and/or automotive components.

1.2. Autonomous Vehicle

Figure 1A:
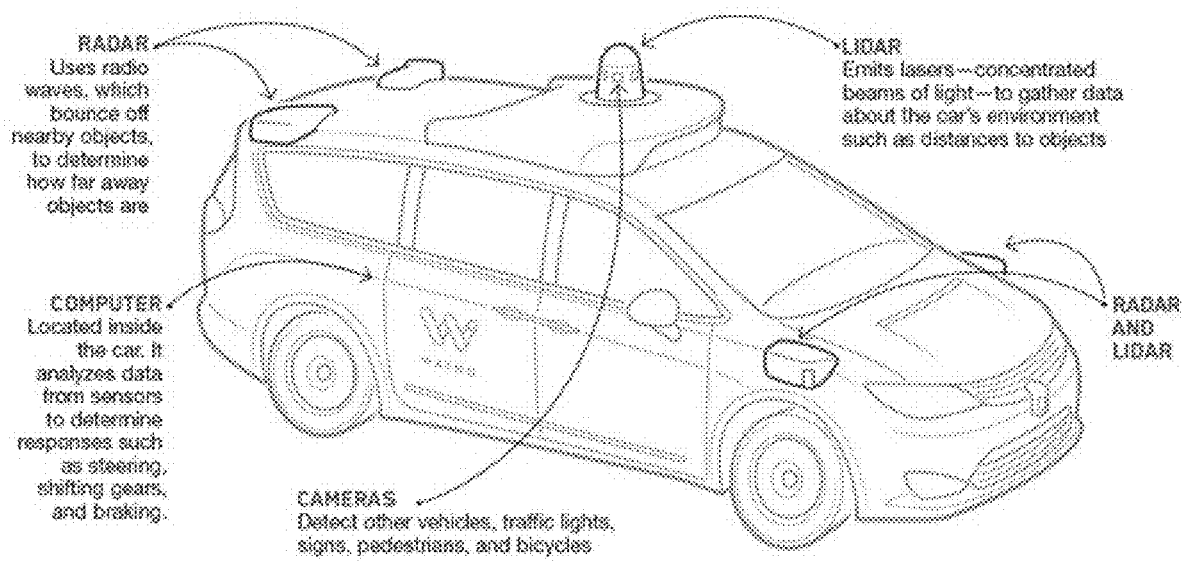
FIGS. 1A and 1B illustrate examples of autonomous vehicles, according to an embodiment.
Figure 1B:
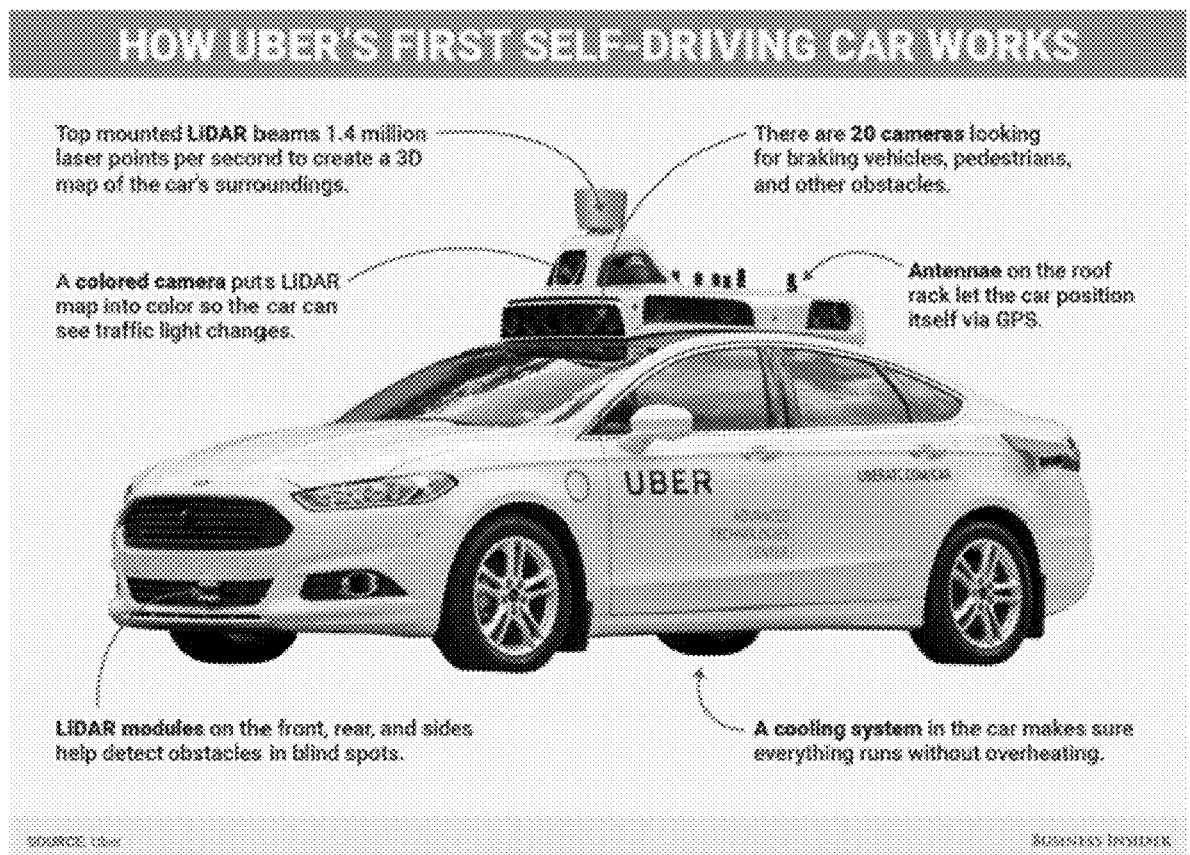

FIGS. 1A and 1B illustrate examples of autonomous vehicles. Typically, vehicle manufacturers, OEMs, automotive suppliers, software developers, and the like, equip their research and development vehicles with sensors, including without limitation, a Global Positioning System (GPS) sensor, a Light Detection and Ranging (Lidar) sensor (sometimes referred to as a "Ladar" sensor), a radar sensor, one or more cameras, and/or the like, that perceive the vehicle's environment, in order to derive information about that environment (e.g., the location of the vehicle within the environment, the presence and position of other objects within the environment, etc.).

1.3. Operating Environment

Figure 2:
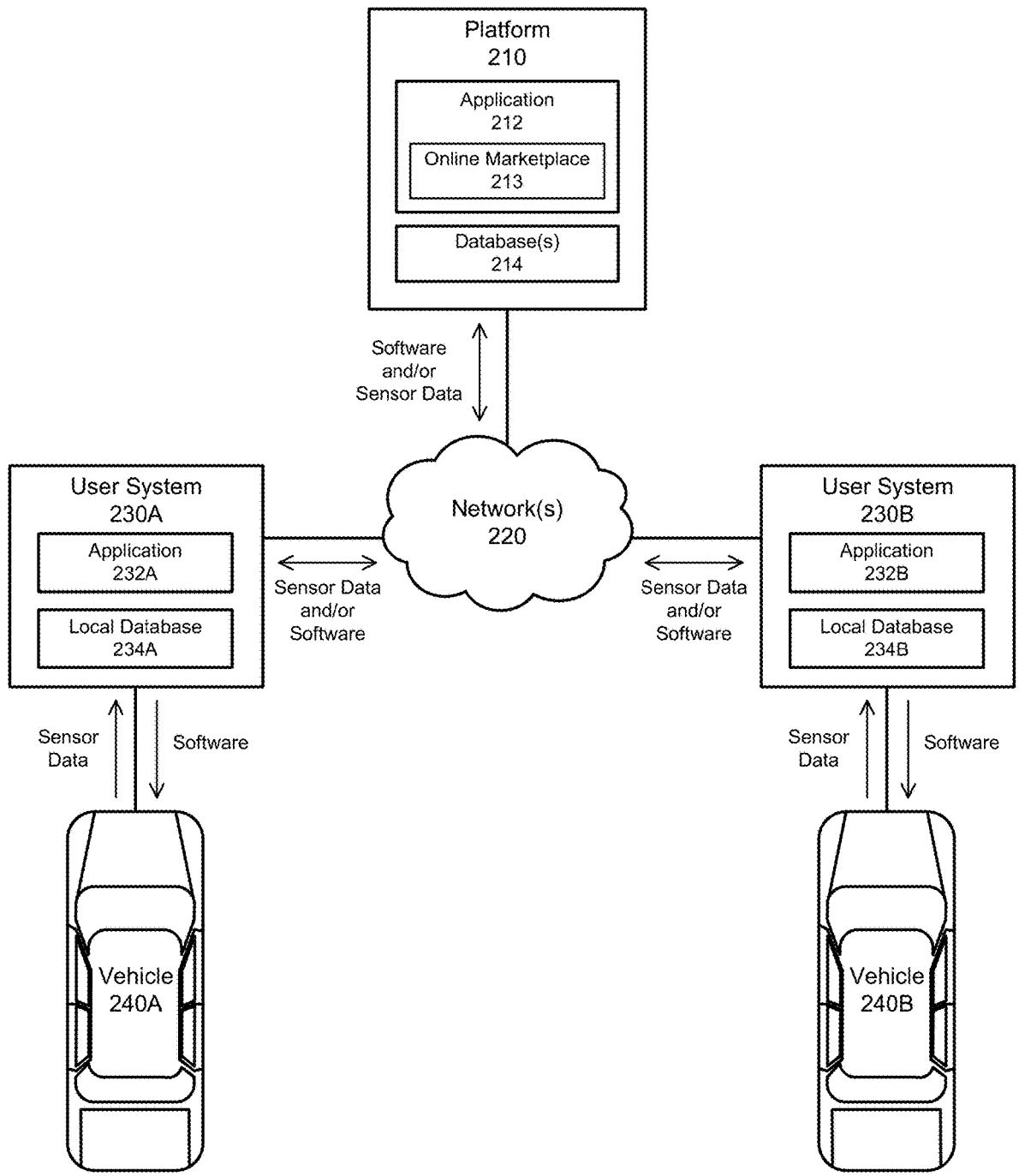
FIG. 2 illustrates an example operating environment, in which one or more of the processes, described herein, may be implemented, according to an embodiment.

FIG. 2 illustrates an operating environment in which data and software for autonomous vehicles may be shared, according to an embodiment. A platform 210 (e.g., one or more servers) hosts and/or executes one or more of the various functions, processes, and/or methods described herein. Platform 210 may comprise dedicated servers, or may instead comprise cloud instances, which utilize shared resources of one or more servers. These servers or cloud instances may be collocated and/or geographically distributed. Platform 210 may also comprise a server application 212 and/or one or more databases 214.

Platform 210 may be communicatively connected to one or more user systems 230 via one or more networks 220. User system(s) 230 may comprise any type or types of computing devices capable of wired and/or wireless communication, including without limitation, desktop computers, laptop computers, tablet computers, smart phones or other mobile phones, servers, electronic kiosks, and/or the like. In addition, each user system 230 may execute a client application 232 and utilize a local database 234. Furthermore, each user system 230 may communicate (e.g., via a wireless or wired communication channel) with the systems of one or more vehicles 240 (e.g., the autonomous vehicles illustrated in FIGS. 1A and 1B) to receive sensor data collected by those systems and/or transmit software to be executed by those systems. User system(s) 230 could either be separate from vehicle 240 (e.g., a distinct computing device that communicates with the sensor(s) and/or autonomous system of vehicle 240) or comprised in vehicle 240 (e.g., within the autonomous system or other data-collection system of vehicle 240).

Network(s) 220 may comprise the Internet, and platform 210 may communicate with user system(s) 230 through the Internet using standard transmission protocols, such as HyperText Transfer Protocol (HTTP), Secure HTTP (HTTPS), File Transfer Protocol (FTP), FTP Secure (FTPS), Secure Shell (SSH) FTP (SFTP), and the like, as well as proprietary protocols. While platform 210 is illustrated as being connected to various systems through a single set of network(s) 220, it should be understood that platform 210 may be connected to the various systems via different sets of one or more networks. Furthermore, while only a couple user systems 230, vehicles 240, one server application 212, and one set of database(s) 214 are illustrated, it should be understood that the operating environment may comprise any number of user systems, vehicles, server applications, and/or databases.

Platform 210 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 210 transmits or serves one or more screens of the graphical user interface in response to requests from user system(s) 230. In some embodiments, these screens may be served in the form of a wizard, in which case two or more screens may be served in a sequential manner, and one or more of the sequential screens may depend on an interaction of the user or user system 230 with one or more preceding screens. The requests to platform 210 and the responses from platform 210, including the screens of the graphical user interface, may both be communicated through network(s) 220, which may include the Internet, using standard communication protocols (e.g., HTTP, HTTPS). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 214) that are locally and/or remotely accessible to platform 210. Platform 210 may also respond to other requests from user system(s) 230.

Platform 210 may further comprise, be communicatively coupled with, or otherwise have access to one or more database(s) 214. For example, platform 210 may comprise one or more database servers which manage one or more databases 214. A user system 230 or server application 212 executing on platform 210 may submit data (e.g., user data, form data, etc.) to be stored in database(s) 214, and/or request access to data stored in database(s) 214. Any suitable database may be utilized, including without limitation MySQL™, Oracle™, IBM™, Microsoft SQL™, Sybase™, Access™, and the like, including cloud-based databases and proprietary databases. Data may be sent to platform 210, for instance, using the well-known POST request supported by HTTP, via FTP, and/or the like This data, as well as other requests, may be handled, for example, by server-side web technology, such as a servlet or other software module (e.g., comprising application 212), executed by platform 210.

In embodiments in which a web service is provided, platform 210 may receive requests from external system(s), and provide responses in eXtensible Markup Language (XML), JavaScript Object Notation (JSON), and/or any other suitable or desired format. In such embodiments, platform 210 may provide an application programming interface (API) which defines the manner in which client applications 232 on user system(s) 230 and/or other external systems may interact with the web service. Thus, these external systems (which may themselves be servers), can define their own user interfaces, and rely on the web service to implement or otherwise provide the backend processes, methods, functionality, storage, and/or the like, described herein. For example, in such an embodiment, a client application 232 executing on one or more user system(s) 230 may interact with a server application 212 executing on platform 210 to execute one or more or a portion of one or more of the various functions, processes, methods, and/or software modules described herein. Client application 232 may be "thin," in which case processing is primarily carried out server-side by server application 212 on platform 210. A basic example of a thin client application is a browser application, which simply requests, receives, and renders webpages at user system(s) 230, while the server application on platform 210 is responsible for generating the webpages and managing database functions. Alternatively, the client application may be "thick," in which case processing is primarily carried out client-side by user system(s) 230. It should be understood that client application 232 may perform an amount of processing, relative to server application 212 on platform 210, at any point along this spectrum between "thin" and "thick," depending on the design goals of the particular implementation. In any case, the application described herein, which may wholly reside on either platform 210 (e.g., in which case application 212 performs all processing) or user system(s) 230 (e.g., in which case application 232 performs all processing) or be distributed between platform 210 and user system(s) 230 (e.g., in which case server application 212 and client application 232 both perform portions of the processing), can comprise one or more executable software modules that implement one or more of the functions, processes, and/or methods of the application described herein.

Regardless of the particular implementation, server application 212 on platform 210 may provide an online marketplace 213 (e.g., online store or exchange) for the sale and purchase of data and software related to autonomous vehicles. In an embodiment, online marketplace 213 enables third parties to sell data (e.g., sensor data, maps for autonomous vehicles, etc.), software (e.g., algorithms for autonomous driving), services (e.g., data annotation, map generation, etc.), and/or other products related to the development and operation of autonomous vehicles. Users, who may be buyers, sellers, or both buyers and sellers, can register with online marketplace 213 to create an account, which can be used to sell and/or purchase products through online marketplace 213. In addition, the users may rate products and/or sellers through a graphical user interface of online marketplace 213.

1.4. Example Processing Device

Figure 3:
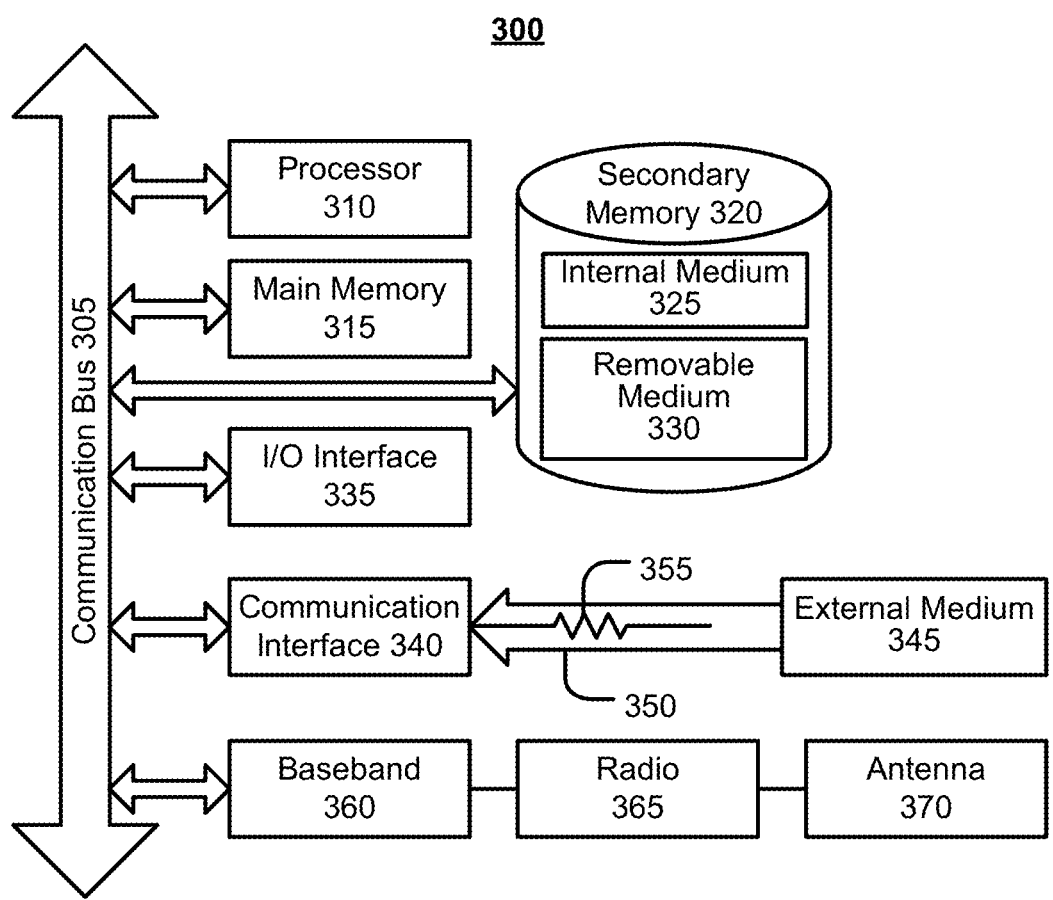
FIG. 3 illustrates an example processing system, by which one or more of the processes, described herein, may be executed, according to an embodiment.

FIG. 3 is a block diagram illustrating an example wired or wireless system 300 that may be used in connection with various embodiments described herein. For example, system 300 may be used as or in conjunction with one or more of the functions, processes, and/or methods (e.g., to store and/or execute the application or one or more modules of the application) described herein, and may represent components of platform 210, user system(s) 230, vehicle(s) 240, and/or other processing devices described herein. System 300 can be a server, a conventional personal computer, or any other processor-enabled device that is capable of wired or wireless data communication. Other computer systems and/or architectures may be also used, as will be clear to those skilled in the art.

System 300 preferably includes one or more processors, such as processor 310. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, or a coprocessor. Such auxiliary processors may be discrete processors or may be integrated with the processor 310. Examples of processors which may be used with system 300 include, without limitation, the Pentium® processor, Core i7® processor, and Xeon® processor, all of which are available from Intel Corporation of Santa Clara, Calif.

Processor 310 is preferably connected to a communication bus 305. Communication bus 305 may include a data channel for facilitating information transfer between storage and other peripheral components of system 300. Furthermore, communication bus 305 may provide a set of signals used for communication with processor 310, including a data bus, address bus, and control bus (not shown). Communication bus 305 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 300 preferably includes a main memory 315 and may also include a secondary memory 320. Main memory 315 provides storage of instructions and data for programs executing on processor 310, such as one or more of the functions and/or modules discussed herein. It should be understood that programs stored in the memory and executed by processor 310 may be written and/or compiled according to any suitable language, including without limitation C/C++, Java, JavaScript, Perl, Visual Basic, .NET, and the like. Main memory 315 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 320 may optionally include an internal memory 325 and/or a removable medium 330. Removable medium 330 is read from and/or written to in any well-known manner. Removable storage medium 330 may be, for example, a magnetic tape drive, a compact disc (CD) drive, a digital versatile disc (DVD) drive, other optical drive, a flash memory drive, and/or the like.

Secondary memory 320 is a non-transitory computer-readable medium having stored thereon computer-executable code (e.g., disclosed software modules) and/or data. The computer software or data stored on secondary memory 320 is read into main memory 315 for execution by processor 310.

In alternative embodiments, secondary memory 320 may include other similar means for allowing computer programs or other data or instructions to be loaded into system 300. Such means may include, for example, a communication interface 340, which allows software and data to be transferred from external storage medium 345 to system 300. Examples of external storage medium 345 may include an external hard disk drive, an external optical drive, an external magneto-optical drive, and/or the like. Other examples of secondary memory 320 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 300 may include a communication interface 340. Communication interface 340 allows software and data to be transferred between system 300 and external devices (e.g. printers), networks, or other information sources. For example, computer software or executable code may be transferred to system 300 from a network server (e.g., platform 210) via communication interface 340. Examples of communication interface 340 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 300 with a network (e.g., network(s) 220) or another computing device. Communication interface 340 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 340 are generally in the form of electrical communication signals 355. These signals 355 may be provided to communication interface 340 via a communication channel 350. In an embodiment, communication channel 350 may be a wired or wireless network (e.g., network(s) 220), or any variety of other communication links. Communication channel 350 carries signals 355 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 315 and/or the secondary memory 320. Computer programs can also be received via communication interface 340 and stored in main memory 315 and/or secondary memory 320. Such computer programs, when executed, enable system 300 to perform the various functions of the disclosed embodiments as described elsewhere herein.

In this description, the term "computer-readable medium" is used to refer to any non-transitory computer-readable storage media used to provide computer-executable code to or within system 300. Examples of such media include main memory 315, secondary memory 320 (including internal memory 325, removable medium 330, and external storage medium 345), and any peripheral device communicatively coupled with communication interface 340 (including a network information server or other network device). These non-transitory computer-readable mediums are means for providing executable code, programming instructions, and software to system 300.

In an embodiment that is implemented using software, the software may be stored on a computer-readable medium and loaded into system 300 by way of removable medium 330, I/O interface 335, or communication interface 340. In such an embodiment, the software is loaded into system 300 in the form of electrical communication signals 355. The software, when executed by processor 310, preferably causes processor 310 to perform one or more of the processes and functions described elsewhere herein.

In an embodiment, I/O interface 335 provides an interface between one or more components of system 300 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 300 may also include optional wireless communication components that facilitate wireless communication over a voice network and/or a data network. The wireless communication components comprise an antenna system 370, a radio system 365, and a baseband system 360. In system 300, radio frequency (RF) signals are transmitted and received over the air by antenna system 370 under the management of radio system 365.

In one embodiment, antenna system 370 may comprise one or more antennae and one or more multiplexors (not shown) that perform a switching function to provide antenna system 370 with transmit and receive signal paths. In the receive path, received RF signals can be coupled from a multiplexor to a low noise amplifier (not shown) that amplifies the received RF signal and sends the amplified signal to radio system 365.

In an alternative embodiment, radio system 365 may comprise one or more radios that are configured to communicate over various frequencies. In an embodiment, radio system 365 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 365 to baseband system 360.

If the received signal contains audio information, then baseband system 360 decodes the signal and converts it to an analog signal. Then the signal is amplified and sent to a speaker. Baseband system 360 also receives analog audio signals from a microphone. These analog audio signals are converted to digital signals and encoded by baseband system 360. Baseband system 360 also codes the digital signals for transmission and generates a baseband transmit audio signal that is routed to the modulator portion of radio system 365. The modulator mixes the baseband transmit audio signal with an RF carrier signal generating an RF transmit signal that is routed to antenna system 370 and may pass through a power amplifier (not shown). The power amplifier amplifies the RF transmit signal and routes it to antenna system 370, where the signal is switched to the antenna port for transmission.

Baseband system 360 is also communicatively coupled with processor 310, which may be a central processing unit (CPU). Processor 310 has access to data storage areas 315 and 320. Processor 310 is preferably configured to execute instructions (i.e., computer programs, such as the disclosed application, or software modules) that can be stored in main memory 315 or secondary memory 320. Computer programs can also be received from baseband processor 360 and stored in main memory 310 or in secondary memory 320, or executed upon receipt. Such computer programs, when executed, enable system 300 to perform the various functions of the disclosed embodiments.

1.5. Sensor Data Format

In an embodiment, all sensor data, recorded by vehicles 240, may be recorded in a single specific file format. For example, if the sensors and/or autonomous systems on vehicles 240 utilize Apex.OS™ or ROS, all sensor data may be recorded in the ROS bag format. However, it should be understood that file formats, other than ROS bag format, may be used. The use of a single specific file format ensures the standardization and compatibility of the data between different user systems 230 and vehicles 240.

2. Process Overview

Embodiments of processes for sharing data and/or software for autonomous vehicles will now be described in detail. It should be understood that the described processes may be embodied in one or more software modules that are executed by one or more hardware processors (e.g., processor 310), e.g., as the application discussed herein (e.g., server application 212, client application 232, and/or a distributed application comprising both server application 212 and client application 232), which may be executed wholly by processor(s) of platform 210, wholly by processor(s) of user system(s) 230, or may be distributed across platform 210 and user system(s) 230, such that some portions or modules of the application are executed by platform 210 and other portions or modules of the application are executed by user system(s) 230. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

2.1. Sensor Data 2.1.1. Distribution

The autonomous systems of vehicles 240, whether in development or production, generally store the historical sensor data that they collect (e.g., for debugging, accident investigation, etc.). In addition, sensor systems may be installed on non-autonomous vehicles 240 to collect data. For example, many vehicle and fleet operators (e.g., taxi companies, ride-share companies, logistics or delivery companies, etc.) drive many, or sometimes even all, streets in certain areas on a daily basis. Even if these vehicles 240 are non-autonomous, they may be outfitted with sensor systems to generate enormous amounts of sensor data. This sensor data can be used for the development of autonomous systems at a relatively low cost (e.g., the cost of purchasing and installing the sensor systems).

As illustrated in FIG. 2, sensor data, collected by vehicle 240, can be uploaded by user system 230 to platform 210, via network(s) 220. For example, as a vehicle 240 is in operation (e.g., driving), a sensor system of the vehicle 240 will generate sensor data, which is stored in a memory onboard the vehicle 240. Periodically (e.g., at regular intervals of, for example, five minutes, ten minutes, fifteen minutes, etc.) or upon returning to a base of operation or development, a user system 230 may retrieve the sensor data, stored in the onboard memory of vehicle 240, and upload the sensor data to platform 210, via network(s) 220.

Although user system 230 is illustrated as separate from vehicle 240, in an alternative embodiment, user system 230 could be installed onboard vehicle 240. In an embodiment in which user system 230 is onboard vehicle 240 and is capable of wireless communications (e.g., cellular communication via antenna 370), onboard user system 230 could retrieve and upload the sensor data to platform 210, periodically, while the vehicle 240 is in the field collecting data (e.g., via a cellular communications network, such as a fourth generation (4G) or fifth generation (5G) broadband cellular network). Alternatively, onboard user system 230 may wait until some trigger before retrieving and/or uploading the sensor data to platform 210. The trigger may be the vehicle 240 returning to a particular location (e.g., base of development or operation), a user operation (e.g., a user selecting an input within a graphical user interface of user system 230 or vehicle 240), a certain type of wireless connection becoming available (e.g., a Wi-Fi™ connection), and/or the like. In an embodiment in which user system 230 is not onboard vehicle 240, user system 230 could retrieve and uploaded the sensor data to platform 210 in response to being connected to the vehicle 240 (e.g., via a wireless or wired connection), in response to a user operation (e.g., a user selection of an input within a graphical user interface of user system 230) after the user system 230 has connected to the vehicle 240 and retrieved the sensor data, and/or the like.

In an embodiment, the application (e.g., server application 212 and/or client application 232) provides a graphical user interface by which users may upload saved sensor data. For example, the graphical user interface may comprise a screen with one or more inputs that enable a user to select one or more data files to upload to platform 210 (e.g., via a file-browsing input that allows users to specify files and/or directories to be uploaded, via a drag-and-drop interface that allows users to drag and drop files and/or directories onto a region of the screen to thereby specify those files and/or directories for upload, etc.).

Alternatively or additionally, in an embodiment in which Apex.OS™ is used, one or more data files may be uploaded using the command-line interface provided by the Apex.OS™ development environment. Specifically, Apex.OS™ may provide a command-line instruction by which a user can directly upload data to the online marketplace 213 of platform 210. For example, once a vehicle 240 has finished a test drive and returned to the vehicle garage, the vehicle 240 (e.g., the sensor system, autonomous system, or other processing system onboard vehicle 240) may be interfaced with user system 230. Alternatively, user system 230 may be integrated onboard vehicle 240. In either case, user system 230 may provide the command-line interface of the Apex.OS™, being executed by vehicle 240, on a display of user system 230 or vehicle 240. An operator of vehicle 240 may enter the command (e.g., ADE_upload_todays_data) to upload the sensor data directly from the command line. The command may have options that enable the operator to specify either to confirm each data file separately or to upload all data files without confirmation (e.g., as a batch).

In an embodiment, the application also provides a graphical user interface by which users may download sensor data (e.g., via purchase). For example, online marketplace 213 of server application 212 may provide a graphical user interface comprising a plurality of screens. The user may navigate to a data screen which provides a list of available data files and/or one or more inputs for searching available data files (e.g., similar to a Google™, Bing™, or other search page). Search criteria may include, without limitation, a recordation date (i.e., the date(s) on which the data within the data file was recorded), a recordation time (e.g., the time(s) at which the data within the data file was recorded), a size of the data file, the type(s) of sensors used to record the data in the data file, the type(s) of roads driven by the vehicle 240 on which the sensors used to record the data in the data file were installed, the price of the data file, characteristics of the data file, events in the data file, metrics of the data file, and/or the like. Each available data file may be associated with a description (e.g., specifying the characteristics, events, and/or metrics of the data file, the size of the data file, the geographical location(s) or region(s) within which sensor data within the data file was recorded, the number, type, and/or setup of sensors used to record the sensor data within the data file, etc.). For a given data file, if the location(s) or region(s), within which sensor data within the data file was recorded, are known, this information may be conveyed within a virtual map provided in the graphical user interface of online marketplace 213. For example, the locations or regions may be represented by polygon(s) (e.g., depicting the borders of the region), pins (e.g., depicting GPS coordinates at which the data was recorded), lines (e.g., depicting routes over which the data was recorded), and/or the like.

Figure 4:
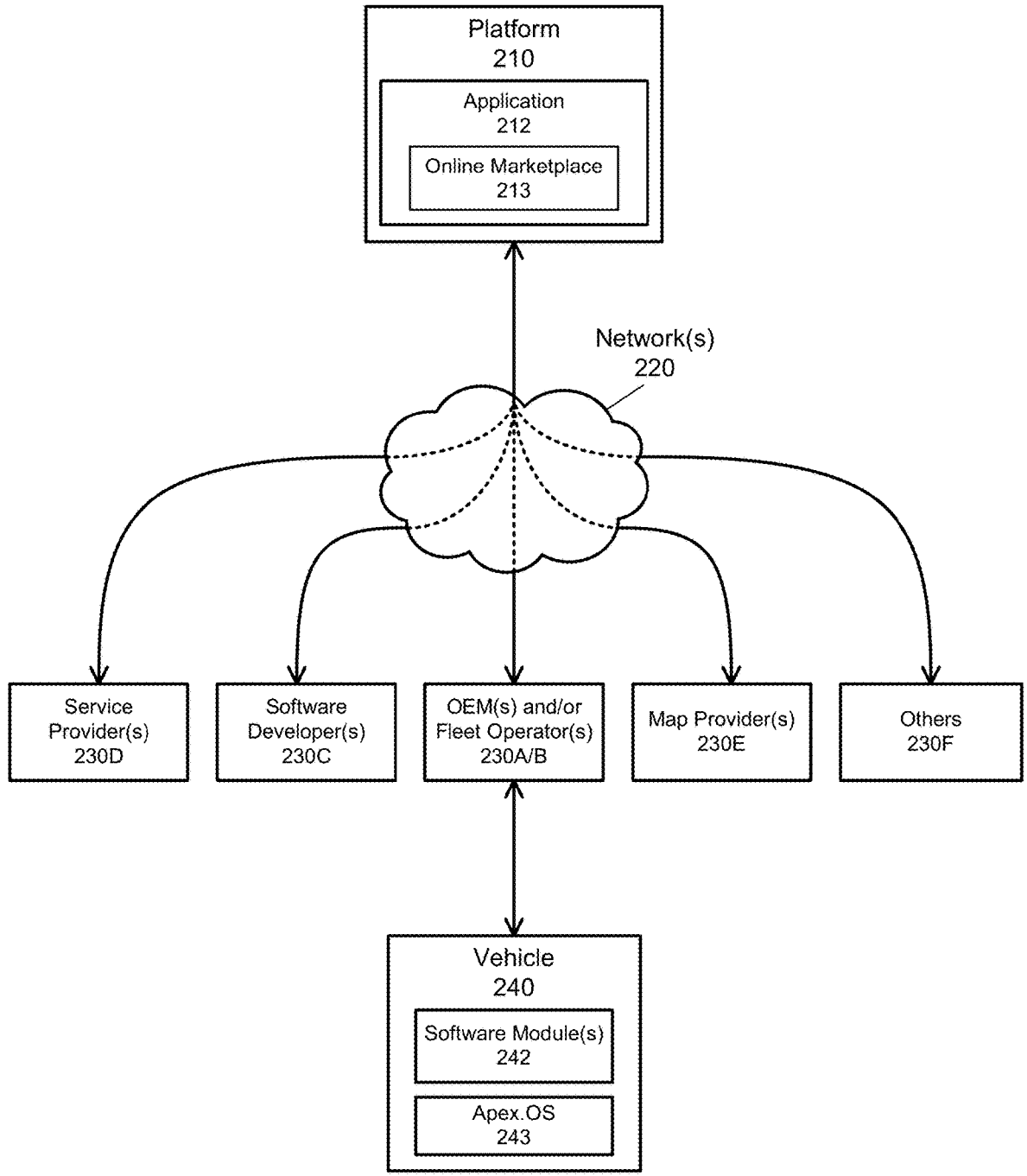
FIG. 4 illustrates an example operating environment, in which one or more of the processes, described herein, may be implemented, according to an embodiment.

With reference to FIG. 4, potential customers for the sensor data may include, without limitation, OEMs and/or fleet operators 230A or 230B (e.g., who may use the sensor data for simulation or testing of vehicles or integration), software developers 230C (e.g., who may use the sensor data to test their software or hardware components), service providers 230D (e.g., who may use the sensor data for data annotation or labeling, data analytics to test their service algorithms, etc.), mapping providers 230E (e.g., who may use the sensor data to generate or update maps, without having to operate their own mapping vehicles), and/or other customers 230F (e.g., municipalities, law enforcement, etc.).

In an embodiment, the sensor data may comprise, without limitation, any one or more of the following detected characteristics: a vehicle, including different types of vehicles (e.g., car, specific brand of car, pickup truck, semi-truck, bus, school bus, train, motorcycle, bicycle, tricycle, caravan, recreational vehicle (RV), construction vehicle, garbage truck, emergency vehicle, police vehicle, ambulance, fire truck, lifeguard vehicle, park ranger vehicle, utility vehicle, plane, helicopter, drone, etc.); a pedestrian, including different types of pedestrians (e.g., person, group or crowd of people, adult, child, baby carriage, bicycle rider, motorcycle rider, jaywalker, etc.); an animal, including different types of animals (e.g., dog, cat, raccoon, deer, etc.); permanent or temporary fixtures including different types of fixtures (e.g., traffic sign, specific traffic sign, overhanging sign, light-emitting diode (LED) traffic sign, LED billboard, conventional billboard, traffic light, traffic light on pole, overhanging traffic light, utility pole, lamp post, zebra crossing, arrow painted on street surface, text painted on street surface, bridge, tunnel, tree, bush, bus stop, school-bus stop, tram station, train station, phone booth, railroad crossing, pedestrian crossing, traffic cone, traffic pillar, building, wall, fence, toll booth, guard rail, etc.); a road feature (e.g., construction zone, switchback, urban or city street, suburban street, countryside street, mountain road, forest road, road between tall buildings, parking lot, highway, freeway, sidewalk, bicycle lane, bicycle lane between vehicle lanes, railroad track, street with missing lane markers, street with center-lane marker but no side-lane markers, dirt road, asphalt surface, gravel surface, cobblestone surface, concrete surface, grass surface, cul-de-sac, traffic circle, traffic circle with two or more lanes, one-way street, one-way street with one lane, one-way street with two parallel lines, one-way street with three parallel lines, one-way street with four parallel lines, one-way street with five parallel lines, one-way street with six parallel lines, one-way street with seven parallel lines, one-way street with eight parallel lanes, one-way street with nine parallel lanes, one-way street with ten or more parallel lines, two-way street with two lanes, two-way street with three lanes, two-way street with four lanes, two-way street with five lanes, two-way street with six lanes, two-way street with seven lanes, two-way street with eight lanes, two-way street with nine lanes, two-way street with ten lanes, two-way street with eleven lanes, two-way street with twelve lanes, two-way street with thirteen lanes, two-way street with fourteen lanes, two-way street with fifteen lanes, two-way street with sixteen lanes, two-way street with seventeen lanes, two-way street with eighteen lanes, two-way street with nineteen lanes, two-way street with twenty or more lanes); and/or the like.

In an embodiment, the sensor data may comprise, without limitation, any one or more of the following detected events: an unsafe driving event; a collision; a wrong-way driver (e.g., automobile, motorcycle, bicycle, etc.); a speeding driver (e.g., by tracking object velocity), a harsh acceleration event (e.g., by tracking object acceleration); a harsh deceleration event (e.g., by tracking object deceleration); and/or the like.

In an embodiment, the sensor data may comprise or be associated with, without limitation, any one or more of the following metrics: vehicle-controller metrics (e.g., lateral cross track error over time, lateral cross track error histogram, lateral desired vs. actual steering wheel angle over time, lateral desired vs. actual steering wheel angle histogram, lateral desired vs. actual steering wheel velocity over time, lateral desired vs. actual steering wheel velocity histogram, longitudinal desired vs. actual velocity over time, longitudinal desired vs. actual velocity histogram, longitudinal desired vs. actual acceleration over time, longitudinal desired vs. actual acceleration histogram, etc.); vehicle-motion metrics (e.g., absolute vehicle velocity over time, absolute vehicle velocity histogram, vehicle velocity relative to speed limit over time, vehicle velocity relative to speed limit histogram, longitudinal acceleration over time, longitudinal acceleration histogram, lateral acceleration over time, lateral acceleration histogram, longitudinal jerk over time, longitudinal jerk histogram, lateral jerk over time, lateral jerk histogram, pitch over time, pitch histogram, roll over time, roll histogram, yaw over time, yaw histogram, etc.); vehicle-behavior-relative-to-object metrics (e.g., histogram of time-to-collision relative to any other object histogram, histogram of time-to-collision relative to preceding vehicle, histogram of time-to-collision relative to following vehicle, histogram of distance to vehicles in neighboring lanes, etc.); machine-vs.-human metrics (e.g., comparison of any of the above characteristic(s), event(s), and/or metric(s), comparison of groups of any of the above characteristic(s), event(s), and/or metric(s), etc.), for example, to compare autonomous drive(s) vs. human-controlled drive(s) along the same route; existence, quantity, or length of certain types of objects or object classes in the data file (e.g., the existence and/or number of any one or more of the above characteristics and/or events); perception metrics (e.g., histogram and/or length of vehicle tracks, for example, in time and distance, histogram and/or length of tracks of any other above event, etc.); and/or the like.

2.1.2. Automated Analysis

In an embodiment, the application (e.g., server application 212) automatically analyzes uploaded data files. The application may perform the analysis for each data file prior to making the data file available for purchase through online marketplace 213.

In an embodiment, the application (e.g., server application 212) analyzes each data file to detect one or more problems with the data file. If any problem(s) are detected, the application may mark or flag the data file to indicate the detected problem(s). Problems may include interruptions in the recordings, for example, due to failing or overloaded storage media (e.g., hard drives) within vehicle 240. Another problem may be the failure of a sensor during recording or any other issue resulting in incomplete data. Specifically, the application may detect the types and configuration of sensors used to record the data, and then determine whether or not the sensors were properly running and recording data through the entire recording. For example, if a Lidar is set to a frequency of 10 Hertz, then one complete Lidar scan must be contained in the data approximately every 100 milliseconds. Otherwise, the data may be incomplete or corrupt. In the event that the application detects that the data file is incomplete, the application may indicate this incompleteness to the user who submitted the data file (e.g., via the graphical user interface). This provides the submitting user with the opportunity to prune the data file such that the remaining data file represents complete and clean data, remove the data file, and/or otherwise remedy the problem (e.g., by replacing the data file with a complete, uncorrupted version of the data file). If the user fails to remedy the problem, the application may prohibit the data file from becoming available for purchase through online marketplace 213. This quality control ensures that buyers of data files will always receive reliable data that are complete and error-free.

In an embodiment, the application (e.g., server application 212) analyzes each data file to ensure that it is compatible to the Apex.OS™ or ROS APIs and formats. For example, the application may ensure that the data file complies with the ROS bag format by parsing the data file and analyzing the messages and data within the parsed dataset for adherence to the specification for the ROS bag format. If the application detects that the data file fails to comply with the standard format, the application may provide the user with the opportunity to resolve the problem, and, if the user fails to resolve the problem, the application may prevent the data file from becoming available for purchase through online marketplace 213. This quality control ensures that buyers of data files always receive data files that are guaranteed to work with Apex.OS™ or ROS.

In an embodiment, the application (e.g., server application 212) analyzes each data file to detect any one or more of the events within the data file and/or compute any one or more of the metrics for the data file (e.g., based on characteristics in the data file). For example, the application, upon receiving a new data file, may automatically analyze the characteristics in the data file to identify a pedestrian jaywalking, the occurrence of an accident, the presence of a police vehicle, and/or any other event. This analysis may be performed by a model that is trained, using machine learning, to detect objects, images, events, and/or the like.

2.1.3. Alerts

In an embodiment, potential buyers of sensor data may set alerts, for example, via the graphical user interface of the application. Specifically, a user may specify one or more criteria via the graphical user interface of online marketplace 213, and, whenever a new data file is uploaded that satisfies the specified criteria, the application may notify the user of the new data file (e.g., via the graphical user interface of online marketplace 213, via a Short Message Service (SMS) text message, via an email message, etc.). The user may be able to specify, as the criteria, any one or more of the characteristics, events, metrics, and/or the like described herein. For example, a user could specify that he or she wants to be alerted whenever a data file is uploaded that represents data recorded in a specific region (e.g., city, portion of a city, specific street, specific Zip code, etc.), represents data recorded across a plurality of regions and includes a certain number of police cars, and/or the like. The application will notify the user anytime a data file, which meets the specified criteria, is available for purchase.

In an embodiment, potential sellers of sensor data may also set alerts, for example, via the graphical user interface of the application. Specifically, a user may specify one or more criteria via a graphical user interface of online marketplace 213, and, whenever another user is searching for a new data file satisfying the specified criteria, the application may notify the user that a potential buyer is available for the data (e.g., via the graphical user interface of online marketplace 213, via an SMS text message, via an email message, etc.). The user may be able to specify, as the criteria, any one or more of the characteristics, events, metrics, and/or the like described herein. For example, a user may be a fleet operator with vehicles in a certain city. He or she can set an alert to be notified whenever another user searches for a data file associated with that city. Thus, the user will be alerted whenever there's a potential sale to be made for that user's sensor data, and can determine whether or not to take advantage of the sales opportunity by collecting new data files using the user's fleet of vehicles and/or uploading existing data files. To preserve the privacy of searching users, the application may scrub (i.e., anonymize) any identifying information about the search from the alerts, so that alerted users cannot determine the identity of the searching users.

In an embodiment, to incentivize potential sellers of sensor data, potential buyers can utilize the graphical user interface of the application to bid a certain amount of money for a data file that satisfies one or more specified criteria (e.g., one or more of the characteristics, events, and/or metrics described herein). For example, a user may need Lidar data from a specific city. The user may utilize a virtual map in a screen of the graphical user interface of online marketplace 213 to mark specific region(s) or street(s). The user may also utilize a screen of the graphical user interface to specify the type(s) of sensor and/or configuration of sensors for which data is requested. The user may specify a certain offer price and, optionally, a time period for which the offer price is valid. The offer and its associated details may be published within the graphical user interface of online marketplace 213, and any potential sellers, who have set alerts that the offer satisfies, may be alerted. Subsequently, other users may view and accept the offer (i.e., provide the requested data file, within the specified time period, in exchange for the offer price or a negotiated price) via the graphical user interface of online marketplace 213.

2.1.4. Samples

In an embodiment, potential buyers can preview and/or test a portion or sample of a data file prior to purchasing it via the application. For example, users may be permitted to preview a camera recording of the data in a screen of the graphical user interface of online marketplace 213. The preview may have a significantly lower resolution than the native resolution in which the data was recorded. As another example, the selling user may mark a subset of the data file (e.g., ten seconds), which other users may download for free and/or for testing, prior to purchasing the entire data file.

In an embodiment, the application (e.g., server application 212) may automatically select and provide a subset of one or more data files to potential buyers of those data buyers. This may be an option to which individual sellers may agree (e.g., via an input of the graphical user interface), or it may be required from all sellers (e.g., via the terms of use for online marketplace 213). The application may provide the ability to look at a sample of a data file centered around a particular event. For example, a potential buyer may specify an event (e.g., a person jaywalking, an accident happening, etc.) for a particular data file via the graphical user interface, and the application may identify the specified event within the data file, and extract a subset of the data around that event (e.g., a thirty second sample surrounding an occurrence of the specified event).

In an embodiment, the application implements controls to prevent users from constructing their own data files from multiple free samples of the same or different data files. In other words, the application may prevent free-loading. For instance, server application 212 may analyze download and purchase patterns to identify users who may be free-loading, and restrict those users' access to subsequent samples (e.g., by preventing those users from downloading samples for a future time period, locking the users' accounts for a future time period, etc.). As an example, if a user has downloaded a certain number of data samples regularly for a week without making any purchases, the application may determine that, that user is attempting to free-load, and automatically restrict the user's future access to samples (e.g., for a certain period of time, until the user makes a purchase, etc.).

2.1.5. Enhancements

In an embodiment, the application (e.g., server application 212) automatically enhances data files, after they have been submitted and, optionally, prior to being made available for purchase via online marketplace 213. For instance, the application may automatically attach or otherwise associate environmental conditions, such as weather (e.g., the presence of rain, hail, snow, wind with wind speed and/or direction, humidity, temperature, etc.), to each data file, based on the location and time associated with that data file. As an example, when a data file is received, server application 212 may query the API of a publicly available third-party weather system (e.g., via network 220), such as the systems of the Weather Underground (wunderground.com) or the National Oceanic and Atmospheric Administration (NOAA), to retrieve historical environmental data for the location and time period associated with the data file. This historical environmental data may then be associated with the data file, such that the data file may be searchable and/or retrievable using the environmental data as search criteria (e.g., to search for data files that only comprise data recorded during sunshine).

In an embodiment, to preserve the privacy of the submitting user, the application (e.g., server application 212) automatically scrubs each data file that is submitted, to anonymize the data file, prior to making the data file available (e.g., for purchase) through online marketplace 213. Alternatively, the application may scrub a data file only when the user, who uploaded the data file, specifically requests it (e.g., via an input of the graphical user interface during submission of the data file). For instance, the application may remove personal information (e.g., driver's name), vehicle-specific information (e.g., Vehicle Identification Number (VIN), license plate number, etc.), and/or the like. In addition, the application may prune the beginning and/or end of the data file to remove the starting and ending locations (e.g., addresses, GPS coordinates, etc.) of the recording. For example, a data file may comprise data that has been recorded from the moment that a vehicle 240 drives out of a user's garage to the moment that the vehicle 240 returns to the user's garage. In this case, if the data contains GPS information, another user could derive the location of the user's garage from the starting and/or ending GPS coordinates. Accordingly, the application may prune predetermined or specified amounts of the starting portion of the data and ending portion of the data (e.g., the first and last five minutes of the data) to obscure the GPS coordinates of the user who submitted the data file.

As discussed elsewhere herein, the application may automatically compute metrics for a data file and associate the computed metrics with the data file (e.g., for searching, description, etc.). In an embodiment, these metrics may be related to the age of the data in the data file. For instance, the application may determine when a route, represented in the data, is outdated (e.g., the route no longer exists, has been altered, for example, to expand or decrease the number of lanes, etc.) by comparing the data to other data recorded for the same route, comparing the route to a list or map representing route changes in the region in which the data was recorded, and/or the like. As another example, the application may determine when the sensors used to collect the data have become outdated, for example, due to the availability of new hardware or software revisions.

2.2. Software 2.2.1. Distribution

Apex.OS™ provides defined and standardized APIs for software modules for perception, localization, planning, and control algorithms. Software developers can use these APIs to develop algorithms, which these developers can then offer (e.g., for free or for sale) through online marketplace 213 of platform 210.

In an embodiment, the application (e.g., server application 212 and/or client application 232) provides a graphical user interface by which users may upload software (e.g., perception, localization, planning, and/or control algorithms for autonomous vehicles). For example, the graphical user interface may comprise a screen with one or more inputs that enable a user to select one or more software files to upload to online marketplace 213 (e.g., via a file-browsing input that allows users to specify files and/or directories to be uploaded, via a drag-and-drop interface that allows users to drag and drop files and/or directories onto a region of the screen to thereby specify those files and/or directories for upload, etc.).

In an embodiment, the application also provides a graphical user interface by which users may download software (e.g., via purchase). For example, the graphical user interface may comprise a screen which provides a list of available software modules and/or one or more inputs for searching available software modules (e.g., via Google™ search, or other search engine). Each available software module may be associated with a description (e.g., specifying the purpose of the software module, the size of the software module, licensing terms for use of the software module, validations of the software module, etc.).

Referring to FIG. 4, potential customers for the autonomous-driving software may include, without limitation, OEMs, fleet operators, automotive suppliers, or system integrators 230A or 230B (e.g., who may integrate the software into their vehicles, autonomous systems or other components, etc.), other software developers 230C (e.g., who may use the software to complement or supplement their own software, test or benchmark their own software, etc.), service providers 230D (e.g., who may use the software for data annotation or labeling, data analytics to test their service algorithms, etc.), mapping providers 230E (e.g., to run the software on their maps), and/or other customers 230F (e.g., municipalities, law enforcement, etc.).

2.2.2. Validation

In an embodiment, the application (e.g., server application 212) may validate all software modules that are submitted by users, prior to making those software modules available (e.g., for purchase) through online marketplace 213. Validation may comprise ensuring that a software module is compatible with the middleware and/or APIs provided by Apex.OS™ and/or ROS, satisfies one or more safety metrics, satisfies one or more quality metrics, satisfies one or more performance metrics, has been tested on certain types of sensors, and/or the like. Software modules that are partially or fully validated may be published with an indication of their validations, whereas software modules that are not validated may either remain unpublished (e.g., until the submitting user corrects the issues) or may be published in online marketplace 213 with an indication of which validations they failed.

In an embodiment, the application (e.g., server application 212) ensures that a submitted software module is compatible with the Apex.OS™ API by building the software module and running it through a series of tests on the backend (e.g., on platform 210). If the software module passes the tests, a label or other indication may be included in the description of the software module in online marketplace 213 to convey to users that the software module has been tested and confirmed to be compatible with Apex.OS™.

In an embodiment, the application (e.g., server application 212) ensures that a submitted software module is compatible with the ROS API by building the software module and running it through a series of tests on the backend (e.g., on platform 210). If the software module passes the tests, a label or other indication may be included in the description of the software module in online marketplace 213 to convey to users that the software module has been tested and confirmed to be compatible with ROS.

In an embodiment, the application computes a functional safety compliance metric for each submitted software module. International Organization for Standardization (ISO) 26262, titled "Road vehicles—Functional safety," is an international standard for functional safety of electrical and/or electronic systems in production vehicles. This standard describes a number of mandatory and recommended measures to achieve different automotive safety integrity levels. The application may analyze each software module using known tests and analytics to generate a compliance score, which may be included in the description of the software module in online marketplace 213 for the benefit of potential buyers. While this score should not replace the assessment of a functional safety assessment and certification agency, it can provide a reliable assessment of best practices and coding requirements to potential buyers.

In an embodiment, the application (e.g., server application 212) computes functional performance metrics for each submitted software module by running the software module through a simulation and/or executing the software module on an actual test vehicle. The functional performance metrics may comprise any one or more of the metrics described herein, and may be included in the description of the software module in online marketplace 213 for the benefit of potential buyers. For example, in the case of a software module for a vehicle's lateral or steering control, the application may run the software module through a simulation or actual vehicle test to compute the lateral cross track error using one or more reference data sets (e.g., driving in a city at city speeds, driving on a highway at highway speeds, etc.). The lateral cross track error may then be displayed in the description of the tested software module as a histogram, along with key metrics, such as the maximum, average, and media lateral cross track error.

In an embodiment, the application (e.g., server application 212) computes computational performance metrics for each submitted software module, for example, by testing how many computational cores on a reference processor (e.g., Intel™, Advanced Reduced Instruction Set Computing Machine (ARM), etc.) are required, whether a graphics processing unit (GPU) is required, how much memory is required, the maximum number of threads, memory and/or thread dynamicity, and/or the like. The application may also use run-time analysis to identify race conditions, memory anomalies, and/or the like. The computational performance metrics may be included in the description of the software module in online marketplace 213 for the benefit of potential buyers.

In an embodiment, the graphical user interface of online marketplace 213 provides inputs which enable a user to compare functional and/or computational performance metrics for two or more software modules. For example, if a user searches for and finds multiple software modules satisfying one or more criteria (e.g., specified by the user), the graphical user interface may provide a comparison of the software modules by visually overlaying histograms of key performance metrics for each software module on each other, or by otherwise providing a side-by-side comparison of the key performance metrics.

In an embodiment, the application (e.g., server application 212) tests each software module using different sensors, and adds, to the description of the software module in online marketplace 213, an indication of each sensor on which the software module has been successfully tested. For example, a developer may have developed a particular software module for a Velodyne™ VLP-16 Lidar. The application may test that software module on other similar Lidars from the same manufacturer (e.g., Velodyne™ HDL-32E, Velodyne™ HDL-64E, etc.) and/or different manufacturers, and, for each tested sensor, add an indication to the description of the software module, in online marketplace 213, of whether or not the software module worked with the tested sensor.

2.3. Services

In an embodiment, the graphical user interface of online marketplace 213 comprises one or more screens to facilitate the sale of services for autonomous vehicle development through online marketplace 213. For example, one user may post a service through a screen of the graphical user interface for online marketplace 213, and another user may purchase the service through another screen of the graphical user interface. The application (e.g., server application 212) may implement functions for completing each transaction (e.g., purchase). Services, available through online marketplace 213, may include, without limitation, annotation or labeling of data, analysis of data, review of data, review of algorithms, code analysis, and/or the like.

In an embodiment, the graphical user interface of online marketplace 213 further comprises one or more screens by which users may provide public and/or private feedback regarding services that they have purchased. For example, a user may post a public review (e.g., narrative description) and/or rating (e.g., out of five stars) of a service that the user purchased through online marketplace 213.

2.4. Maps

In an embodiment, the graphical user interface of online marketplace 213 comprises one or more screens to facilitate the sale of maps for autonomous vehicles through online marketplace 213. For example, one user may post a map through a screen of the graphical user interface of online marketplace 213, and another user may purchase the map through another screen of the graphical user interface. The application (e.g., server application 212) may implement functions for completing each transaction (e.g., purchase).

The graphical user interface of online marketplace 213 may enable users to analyze and compare different map providers 230E, different map formats, and/or the like. In addition, a user may select a geographical area to compare maps, available for that geographical area, from different map providers 230E, according to the types of data recorded in the maps, the recentness of the maps (e.g., how up-to-date the map is), the completeness of the maps, the level of detail provided by the maps, and/or other properties of the maps.

In an embodiment, the application (e.g., server application 212) automatically analyzes and produces metrics for maps, after they have been submitted and prior to being made available for purchase via online marketplace 213, and provides these metrics to users (e.g., in the description of the maps in online marketplace 213). For example, the application may analyze the absolute size of a submitted map, the relative size of the submitted map per area, and/or the like.

In an embodiment, the application (e.g., server application 212) automatically detects the features in submitted maps, after they have been submitted and prior to being made available for purchase via online marketplace 213, and provides these features to users (e.g., in the description of the maps in online marketplace 213). The features, detected by the application, may include, without limitation, roads, lanes, lane markers, different types of lane markers, sidewalks, positions and types of traffic signs, positions and types of traffic lights, crosswalks, landmarks typically used for vehicle localizations, and/or the like.

In an embodiment, the application (e.g., server application 212) automatically identifies the types of sensors used to record submitted maps, after they have been submitted and prior to being made available for purchase via online marketplace 213, and identifies these types of sensors to users (e.g., in the description of the maps in online marketplace 213).

In an embodiment, the application (e.g., server application 212) automatically analyzes submitted maps, after they have been submitted and prior to being made available for purchase via online marketplace 213, to identify whether or not the maps comprise three-dimensional point clouds, and identifies whether or not the maps comprise three-dimensional point clouds to users (e.g., in the description of the maps in online marketplace 213).

In an embodiment, the application (e.g., server application 212) automatically analyzes submitted maps (e.g., periodically, or after having been submitted and prior to being made available via online marketplace 213) to identify the age of each map. Based on the identified age, the application may derive a metric representing how up-to-date each map is. The metric for each map may be derived by cross-comparing the data for the map with other information sources or data files to determine similarities (e.g., indicating up-to-date data) and/or disparities (e.g., representing non-up-to-date data) between the data.

In an embodiment, the application (e.g., server application 212) automatically prunes one or more maps, stitches two or more maps together into a composite map, and/or composes compatible maps into larger composite maps of a single area. For example, if a user requests or searches for a map of San Francisco (e.g., satisfying one or more criteria) and no map has been previously submitted for San Francisco (e.g., that satisfies the user's one or more criteria), but the application has a map of California (e.g., that satisfies the user's one or more criteria), the application may extract a map of San Francisco from the map of California and provide it to the user for purchase in online marketplace 213. The user may be charged less for the extracted map (e.g., the map of San Francisco) than he or she would have been charged for the larger map (e.g., the map of California). The difference in cost may be based on the ratio of the data size of the extracted map to the data size of the larger map, or in any other appropriate manner.

2.5. Metrics and Analytics

In an embodiment, the graphical user interface of online marketplace 213 comprises one or more screens to facilitate the sale of metrics for analytics and/or analytics as a service. For example, as described elsewhere herein, metrics may be computed for each data file submitted to online marketplace 213. These metrics may be aggregated for a plurality of data files, and the aggregated metrics themselves, and/or use of the aggregated metrics for analytics may be, available for purchase through a screen of the graphical user interface. The application (e.g., server application 212) may implement functions for completing each transaction (e.g., purchase or usage of the metrics).

In other words, the metrics computed for one or a plurality of data files may be available for purchase or analysis through online marketplace 213, distinct from the data files themselves. Any of the metrics described herein may be available in this manner.

In an embodiment, metrics from related data files may be aggregated by the application for purchase. For example, metrics may be aggregated from a plurality of data files that comprise data obtained within the same geographical region, that comprise data collected by the same vehicle or type of vehicle, that comprise data collected by the same type of sensors, that comprise data that share one or more characteristics and/or events, and/or the like. The application may automatically aggregate the metrics and/or may aggregate the metrics based on one or more criteria specified by a user (e.g., via a screen of online marketplace 213).

2.6. Example Use Cases

FIG. 4 illustrates the various parties who may utilize platform 210 via respective user systems 230A-230F, according to an embodiment. Some exemplary, non-limiting utilizations of platform 210 will now be described in more detail.

In a first example, a vehicle operator 230A may collect sensor data via operated vehicle(s) 240. Each vehicle 240 may execute Apex.OS™ 243 to collect and store sensor data from a sensor system or autonomous system of vehicle 240 and/or may execute one or more software modules 242 to control the autonomous system of vehicle 240 (e.g., based on the collected sensor data). Vehicle operator 230A may then submit the collected sensor data, via network(s) 220, to application 212. Application 212 may analyze (e.g., to ensure compatibility, to ensure completeness, etc.) and enhance the data (e.g., by detecting events, computing associated metrics, adding weather data, anonymizing the data, etc.), as described elsewhere herein, and publish the enhanced data in online marketplace 213. The enhanced data may then be purchased from online marketplace 213 by other operator(s) 230B, software developer(s) 230C, service provider(s) 230D, map provider(s) 230E, and/or other users 230F.

In a second example, a software developer 230C may write a software module comprising an algorithm that utilizes the API of Apex.OS™ 243. Software developer 230C may then submit the software module, via network(s) 220, to application 212. Application 212 may analyze the software module (e.g., to ensure compatibility, compute compliance metrics, compute functional and/or computational performance metrics, test the software on different types of sensors, etc.), as described elsewhere herein, and publish the software module in online marketplace 213. The software module may then be purchased from online marketplace 213 by OEM(s) or fleet operator(s) 230A or 230B, and installed as software module 242 in their vehicle(s) 240, to control the autonomous systems of those vehicles 240 (e.g., utilizing APIs of Apex.OS™ 243). The software module may also be purchased from online marketplace 213 by other software developer(s) 230C, service provider(s) 230D, map provider(s) 230E, and/or other users 230F.

In a third example, a service provider 230D may offer its service(s) (e.g., data annotation, analytics, etc.) via online marketplace 213. These service(s) may be purchased from online marketplace 213 by OEM(s) or fleet operator(s) 230A or 230B, software developer(s) 230C, other service provider(s) 230D, map provider(s) 230E, and/or other users 230F.

In a fourth example, a map provider 230E may submit one or more maps, via network(s) 220, to application 212. Application 212 may publish the map(s) in online marketplace 213, and may derive partial and/or composite maps from any available maps. The original and/or derived map(s) may then be purchased from online marketplace 213 by OEM(s) or fleet operator(s) 230A or 230B, software developer(s) 230C, other service provider(s) 230D, other map provider(s) 230E, and/or other users 230F.

In a fifth example, any other type of user 230F may submit some other product, related to autonomous vehicles, via network(s) 220, to application 212. Application 212 may publish the product in online marketplace 213, optionally, after performing some analysis and/or enhancement. That product may then be purchased from online marketplace 213 by OEM(s) or fleet operator(s) 230A or 230B, software developer(s) 230C, other service provider(s) 230D, map provider(s) 230E, and/or other users 230F.

In a sixth example, application 212 may compute associated metrics for data files, as discussed elsewhere herein (e.g., with respect to the first example above). Application 212 may aggregate these metrics based on predefined and/or user-specified criteria, and provide them via online marketplace 213. The metrics may be provided as a downloadable file, for usage (e.g., via an API), and/or for use in conjunction with an analytics service. As a concrete example, there is currently a need to develop safety metrics for use in research, government regulation (e.g., to define safety compliance thresholds), and/or the like. The aggregated metrics can be used to define safety thresholds, benchmarks, and/or the like. For example, metrics for a distance between a vehicle and environmental objects (e.g., leading and following vehicles), aggregated for an autonomous vehicle, may be compared to the same metrics, aggregated for a non-autonomous vehicle or a different autonomous vehicle (e.g., by computing and comparing histograms). A score may be derived from this comparison to represent how the autonomous vehicle's distances relate to the non-autonomous or other autonomous vehicles' distances. Advantageously, a manufacturer or operator of the autonomous vehicle could then utilize this score to determine whether or not the algorithms used for controlling those distances should be adjusted (e.g., to improve the vehicle's time-to-collision to at least match or exceed those for a human-driven vehicle or a benchmark for other autonomous vehicles). Any of the metrics described herein may be used in a similar or identical manner to improve the software modules for controlling autonomous vehicles.

Figure 5:
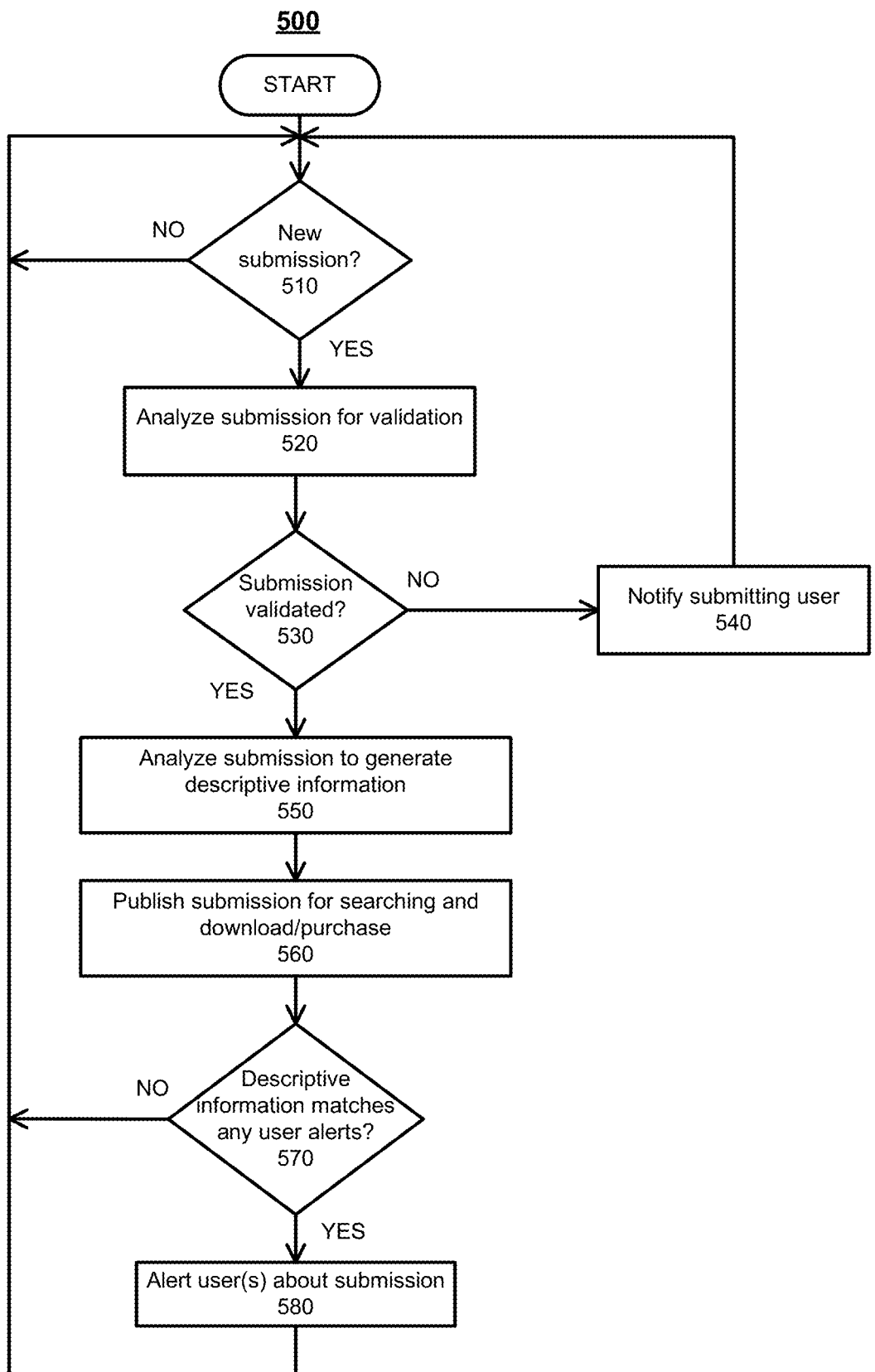
FIG. 5 illustrates an example data exchange process, according to an embodiment.

FIG. 5 illustrates an example data exchange process 500, according to an embodiment. Process 500 may be implemented by application 212 on platform 210. While process 500 is illustrated with a certain set and arrangement of steps, in alternative embodiments, process 500 may be implemented with fewer, more, or different steps, and/or a different arrangement of steps than those illustrated in FIG. 5.

In step 510, process 500 waits until a new submission is received. In an embodiment, the submission may be a new data file, a new software module, and/or a new map that has been uploaded or otherwise submitted by a user. Whenever a new submission is received (i.e., "YES" in step 510), process 500 proceeds to step 520. Otherwise (i.e., "NO" in step 510), process 500 continues to wait for a new submission.

In step 520, process 500 automatically analyzes the new submission for the purposes of validating the submission, as discussed elsewhere herein. For example, for a data file, step 520 may comprise determining whether the data file comprises interruptions in the recorded data, indications of failures in one or more sensors, corrupt data, incomplete data, incompatible data, and/or the like. For a software module, step 520 may comprise ensuring that the software module is compatible with certain software (e.g., Apex.OS™, ROS, etc.), complies with one or more safety, quality, and/or performance metrics, is compatible with certain types of sensors, and/or the like.

In step 530, process 500 determines whether or not the submission was successfully validated in step 520. If the submission was not successfully validated (i.e., "NO" in step 530), process 500 proceeds to step 540. Otherwise, if the submission was successfully validated (i.e., "YES" in step 530), process 500 proceeds to step 550.

In step 540, process 500 notifies the user, who submitted the submission in step 510, that the submission could not be validated. The notification may be provided via a graphical user interface of the application or by some other means (e.g., email, SMS text message, etc.). The notification enables the user to address any issues with the validation and resubmit the submission in step 510.

In step 550, process 500 automatically analyzes the validated submission to generate descriptive information. For example, if the submission is a data file, server application 212 may automatically analyze the data file to detect a set of one or more characteristics and/or events represented in the data file. In addition, server application 212 may compute one or more metrics for the data file (e.g., based on the detected characteristic(s) and/or event(s)). The set of characteristics and/or events detected and the metrics computed may be any combination of one or more of the characteristics, events, and metrics listed elsewhere herein. As another example, if the submission is a software module, server application 212 may automatically analyze the software module to compute one or more safety compliance metrics, functional performance metrics, and/or computational performance metrics, and/or test the software module (e.g., using different types and/or models of sensors), as discussed elsewhere herein.

In step 560, process 500 publishes the submission, for example, in online marketplace 213, in association with the descriptive information generated in step 550. In an embodiment, online marketplace 213 may provide or be interfaced with a search engine that is able to search the descriptive information of published submissions based on one or more criteria (e.g., a keyword search), and provide one or more published submissions as search results to users. Searches may be performed in response to user operations (e.g., submission of one or more criteria in a screen of the graphical user interface of the application) and/or based on alerts set by users (e.g., by a user specifying one or more criteria within a setting screen of the graphical user interface of the application). In addition, once a submission has been published in step 560, users may view the descriptive information, and choose to purchase and/or download the submission, via the graphical user interface of online marketplace 213.

In step 570, process 500 determines whether the descriptive information, generated for the submission in step 550, matches any user alerts. For example, as described elsewhere herein, users may set alerts, specifying one or more criteria, representing the users' interests in data files and/or software modules. Every time a new submission is published for purchase, the descriptive information for that submission may be compared to the criteria in each set alert to determine whether or not the descriptive information satisfies the criteria. In the case of a data file, the criteria may comprise the absence or presence of one or more characteristics and/or events in the data file, a value or range of values for one or more metrics computed for the data file, and/or the like. In the case of a software module, the criteria may comprise a value or range of values for one or more safety compliance metrics and/or performance metrics, an indication of the types of sensors with which the software module is compatible and/or on which the software module has been tested, and/or the like. If one or more matches are found (i.e., "YES" in step 570), process 500 proceeds to step 580. Otherwise, if no matches are found (i.e., "NO" in step 570), process 500 returns to step 510 to await further submissions.

In step 580, process 500 notifies each user, who has set an alert with criteria that are satisfied by the submission published in step 560, about the new submission. The notification may be provided via a graphical user interface of the application or by some other means (e.g., email, SMS text message, etc.). The notification may provide a link (e.g., hyperlink) to a screen for viewing descriptive information about the submission and/or purchasing the submission. This notification process allows users to set criteria in advance, and be notified whenever a newly published submission (e.g., data file and/or software module) satisfies those criteria. After notifying each user to be alerted in step 580, process 500 returns to step 510 to await further submissions.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive sensor data, collected by one or more sensor systems of one or more vehicles, and submitted by a first user via at least one network;
   automatically analyze the sensor data to detect one or more characteristics of the sensor data and to enhance the sensor data, prior to publishing a description of the sensor data in an online marketplace;
   generate a graphical user interface comprising one or more screens of the online marketplace via which a second user may view the description of the sensor data and purchase the sensor data for download via the at least one network; and
   provide a free sample of the sensor data to the second user.

2. The method of claim 1, wherein detecting one or more characteristics comprises detecting an interruption in the sensor data.

3. The method of claim 1, wherein detecting one or more characteristics comprises:
   detecting one or both of a type and configuration of sensors used to capture the sensor data; and
   determining whether or not the sensors properly captured data throughout the entire sensor data.

4. The method of claim 1, wherein detecting one or more characteristics comprises parsing the sensor data to determine whether or not the sensor data adheres to a particular format.

5. The method of claim 4, wherein the particular format is Robot Operating System (ROS) bag format.

6. The method of claim 1, further comprising using the at least one hardware processor to, when at least one characteristic is detected by the analysis of the sensor data and the at least one characteristic comprises a problem:

notify the first user about the problem; and
receive corrected sensor data from the first user via the at least one network.

7. The method of claim 1, wherein enhancing the sensor data comprises:
analyzing the one or more characteristics of the sensor data to detect one or more events in the sensor data; and
associating the detected one or more events with the sensor data.

8. The method of claim 7, wherein associating the detected one or more events with the sensor data comprises adding an indication of the one or more events to the description of the sensor data.

9. The method of claim 1, wherein enhancing the sensor data comprises:
computing one or more metrics of the sensor data; and
associating the computed one or more metrics with the sensor data.

10. The method of claim 9, wherein associating the computed one or more metrics with the sensor data comprises adding an indication of the one or more metrics to the description of the sensor data.

11. The method of claim 9, wherein computing one or more metrics of the sensor data comprises comparing the sensor data to one or more other sensor data to determine a metric of how up-to-date the sensor data is.

12. The method of claim 1, wherein enhancing the sensor data comprises:
identifying a geographic location and time associated with the sensor data;
retrieving environmental conditions, associated with the geographic location and time, from an external system, via the at least one network; and
associating the environmental conditions with the sensor data.

13. The method of claim 1, wherein enhancing the sensor data comprises removing data that identifies one or more of a person, a location, and a vehicle from the sensor data.

14. The method of claim 13, wherein removing data that identifies a location from the sensor data comprises pruning a beginning portion of the sensor data and an ending portion of the sensor data from the sensor data.

15. The method of claim 1, further comprising using the at least one hardware processor to:
receive one or more criteria from the second user;
determine that the sensor data satisfies the one or more criteria; and
notify the second user that the sensor data is available for purchase.

16. The method of claim 1, further comprising using the at least one hardware processor to:
receive one or more criteria from the first user;
receive a search or request for sensor data from the second user, wherein the search or request for sensor data satisfies the one or more criteria; and
notify the first user about the searched or requested sensor data.

17. The method of claim 16, wherein the request comprises a bid price for the requested sensor data.

18. The method of claim 15, wherein the one or more criteria comprise one or more of a geographical location within which the sensor data was collected, a characteristic of the sensor data, an event represented in the sensor data, or a metric of the sensor data.

19. The method of claim 1, further comprising using the at least one hardware processor to:
analyze a pattern of the second user's access to free samples of sensor data via the online marketplace over a time period; and
in response to the pattern of the second user's access matching a pattern that indicates an attempt to compose a data file from the free samples, restricting the second user's future access to free samples.

20. The method of claim 1, wherein the free sample consists of a portion of the sensor data.

21. The method of claim 1, wherein the free sample comprises a lower-resolution version of at least a portion of the sensor data.

22. The method of claim 1, further comprising using the at least one hardware processor to:
receive a software module, submitted by a third user, via the at least one network, wherein the software module comprises instructions for controlling an autonomous system of a vehicle;
automatically analyze the software module to derive information about the software module; and
generate a graphical user interface comprising one or more screens of the online marketplace via which another user may view a description of the software module and purchase the software module for download via the at least one network.

23. The method of claim 22, wherein analyzing the software module comprises determining whether or not the software module is compatible with an application programming interface (API) of software for interacting with the autonomous system of the vehicle.

24. The method of claim 23, wherein the software for interacting with the autonomous system of the vehicle is a robot operating system.

25. The method of claim 22, wherein analyzing the software module comprises computing a metric for the software module, and wherein the description of the software module comprises the computed metric.

26. The method of claim 25, wherein the computed metric comprises a functional safety compliance metric.

27. The method of claim 25, wherein the computed metric comprises a functional performance metric.

28. The method of claim 25, wherein the computed metric comprises a computational performance metric.

29. The method of claim 22, wherein analyzing the software module comprises testing the software module using a plurality of types of sensors, and wherein the description of the software module comprises each one of the plurality of types of sensors for which the software module was successfully tested.

30. The method of claim 1, further comprising using the at least one hardware processor to:
receive a description of a service, submitted by a fourth user, via the at least one network, wherein the service is related to autonomous vehicles; and
generate a graphical user interface comprising one or more screens of the online marketplace via which another user may view a description of the service and purchase the service.

31. The method of claim 1, further comprising using the at least one hardware processor to:
receive a virtual map, submitted by a fifth user, via the at least one network; and
generate a graphical user interface comprising one or more screens of the online marketplace via which another user may view a description of the virtual map and purchase the virtual map for download via the at least one network.

32. The method of claim 31, further comprising using the at least one hardware processor to:
- analyze the virtual map to determine whether or not the virtual map comprises a three-dimensional point cloud; and,
- when the virtual map is determined to comprise a three-dimensional point cloud, add an indication that the virtual map comprises a three-dimensional point cloud to the description of the virtual map.

33. The method of claim 31, further comprising using the at least one hardware processor to:
- receive a request for a virtual map of a geographical region that satisfies one or more criteria, via the at least one network;
- extract a portion, comprising the geographical region and satisfying the one or more criteria, from an existing virtual map that comprises the geographical region and at least one other geographical region; and
- provide the extracted portion, in response to the request, via the at least one network.

34. The method of claim 31, further comprising using the at least one hardware processor to:
- receive a request for a virtual map of a geographical region that satisfies one or more criteria, via the at least one network;
- generate a composite map, comprising the geographical region and satisfying the one or more criteria, from two or more existing virtual maps that each comprise a portion of the geographical region; and
- provide the composite map, in response to the request, via the at least one network.

35. The method of claim 1, further comprising using the at least one hardware processor to:
- compute one or more aggregate metrics for a plurality of the sensor data; and
- provide the one or more aggregate metrics for purchase or analysis via one or more screens of the online marketplace.

36. A system comprising:
- at least one hardware processor; and
- one or more software modules configured to, when executed by the at least one hardware processor,
  - receive sensor data, collected by one or more sensor systems of one or more vehicles, and submitted by a first user via at least one network,
  - automatically analyze the sensor data to detect one or more characteristics with the sensor data and to enhance the sensor data, prior to publishing a description of the sensor data in an online marketplace,
  - generate a graphical user interface comprising one or more screens of the online marketplace via which a second user may view the description of the sensor data and purchase the sensor data for download via the at least one network, and
  - provide a free sample of the sensor data to the second user.

37. A non-transitory computer-readable medium having instructions stored therein, wherein the instructions, when executed by a processor, cause the processor to:
- receive sensor data, collected by one or more sensor systems of one or more vehicles, and submitted by a first user via at least one network;
- automatically analyze the sensor data to detect one or more characteristics with the sensor data and to enhance the sensor data, prior to publishing a description of the sensor data in an online marketplace;
- generate a graphical user interface comprising one or more screens of the online marketplace via which a second user may view the description of the sensor data and purchase the sensor data for download via the at least one network; and
- provide a free sample of the sensor data to the second user.

\* \* \* \* \*